Feb. 22, 1966    A. BRUNNER    3,236,449
METHOD AND APPARATUS FOR CONTROLLING FUEL AND
AIR SUPPLIED TO A COMBUSTION CHAMBER
Filed Nov. 28, 1962    2 Sheets-Sheet 1

INVENTOR.
ALFRED BRUNNER.
BY
K. A. Mayr
ATTORNEY.

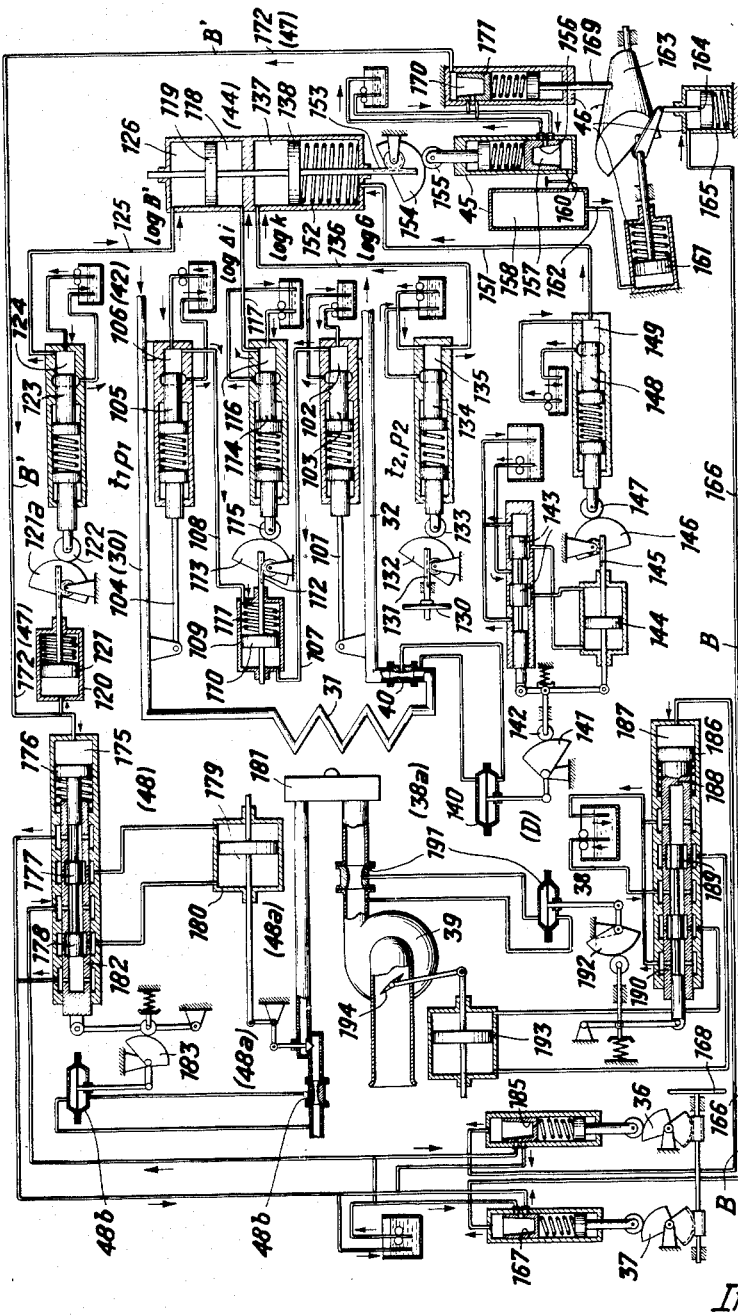

United States Patent Office

3,236,449
Patented Feb. 22, 1966

1

3,236,449
METHOD AND APPARATUS FOR CONTROLLING FUEL AND AIR SUPPLIED TO A COMBUSTION CHAMBER
Alfred Brunner, Winterthur, Switzerland, assignor to Sulzer Freres, S.A., Winterthur, Switzerland, a corporation of Switzerland
Filed Nov. 28, 1962, Ser. No. 242,346
Claims priority, application Switzerland, Mar. 12, 1958, 56,928
7 Claims. (Cl. 236—15)

This is a continuation-in-part of application Serial No. 798,038, filed March 9, 1959, now abandoned.

This invention relates to the art of controlling fuel and combustion air supplied to a combustion chamber to effectively accommodate variable load demands that are placed on the heat consumer that is associated with the combustion chamber. More specifically, the invention involves method and apparatus wherein the control of fuel and combustion air supplied to a combustion chamber is effected according to the difference between the heat actually produced in the combustion chamber and the theoretical heating value of the combustion components, namely fuel and air, that are supplied to the combustion chamber so that these fuel and air supplies are adjusted particularly according to the changing heat value characteristics of the fuel and to the changing combustion efficiency of the apparatus.

In the method and apparatus according to this invention, the supplies of combustion components, fuel and air, to an apparatus producing heat for a heat consumer operating under variable load conditions are simultaneously adjusted according to the load, maintaining a predetermined definite ratio between the magnitude of the fuel supply and the magnitude of the air supply for each particular load. This definite ratio for each load is predetermined taking into consideration the contemplated heating value of the fuel and the combustion efficiency inherent in the combustion apparatus. The heat made available from the combustion apparatus by the combustion of fuel or a value indicative of this available heat is at least periodically measured and is compared with the amount of heat theoretically producible by the fuel and air supplied to the combustion chamber for the particular load setting. The signal or indication resulting from this comparison is used to supplementally control the supply of at least one of the combustion components, namely fuel or air.

If the combustion chamber forms part of a steam generator the value corresponding to the amount of heat released or made available by the combustion of fuel in the combustion chamber is, for example, the amount of heat absorbed by the water during its conversion to superheated steam or is at least proportional to the heat absorbed by at least a predetermined section of the heating surfaces of the steam generator. At least a portion of the heat released by the combustion and representative of the total heat may be measured by measuring the radiation in the combustion chamber or by measuring the heat transfer to a body exposed to the hot combustion products, for example, an auxiliary tube section of a steam generator.

The difference between the liberated heat and the heat which must be supplied to answer a given load and which is—theoretically—contained in the fuel and air supplied to the combustion chamber preferably is integrated over a certain time, i.e., the respective signal is accumulated, so that momentary variations as they occur during actual operation are rendered ineffective. The mean value of the aforesaid difference is used as a signal for controlling the fuel supply.

2

The method and apparatus according to the invention is particularly useful when the ratio fuel/air is not constant, for example, if at part load a greater amount of excess air is required than at full load.

The method and apparatus of this invention has special utility in connection with once-through steam generators that characteristically do not retain any substantial quantity of water to be converted into steam. In this type of steam generator, there is no water drum containing a sizable volume of water at a temperature close to the boiling point. The water is converted into steam in a single pass through tubing exposed to the products of combustion. Control of this type of steam generator presents special problems particularly where wide variations in the quantity of steam demanded from the generator or in the load on the generator are encountered.

In the control method and apparatus as disclosed in more detail hereinafter, two separate control signals, one for the fuel supply and one for the air supply are produced. The magnitude of each of these control signals is determined based upon the heating value of the fuel to be employed in the combustion apparatus and the combustion efficiency inherent in this apparatus, the separate signals having a predetermined ratio for each different load condition. The ratios for different load conditions may in themselves be different recognizing that the inherent efficiency characteristics of the particular combustion apparatus may call for more or less excess air in achieving maximum efficiency of combustion for each particular load condition. Absent variations in the heating value of the fuel or in the inherent combustion efficiency of the combustion apparatus these separate signals are used to give accurate control of the supplies of combustion components such that for each change in load the exactly proper signal for fuel and for air to be increased or decreased will be provided.

In the method and apparatus direct control of one of the combustion components according to the control signal produced for such component is carried out. The other control signal is combined or compared with a signal corresponding to the heat released by the combustion apparatus to give a combination control signal or it is interrelated with the heat theoretically producible by combustion of the fuel and air to provide a supplementary control signal. Thereupon the combination of supplementary control signal is employed to control the other combustion component. This mode of control of the other combustion component assures redajustment of the control effect to accommodate the operation of the combustion apparatus to any detected deviation of the heating value of the fuel or of the combustion efficiency of the combustion apparatus which may occur.

It is significant in the instant invention that normally the separate signals will be fully effective to obtain, without more, proper adjustment in supplying the combustion components, fuel and air, for each particular load condition. The combination or supplementary control signal only produces a follow-up for minor adjustment which may be dictated as needed by reason of changes in the fuel heating value or combustion efficiency. Thus the basic or major control is obtained by the control signals which in and of themselves have a predetermined ratio for each load condition and are originally determined to take into consideration the expected fuel heating value and inherent combustion efficiency.

A principal object of this invention resides in providing a control method and apparatus for the combustion components, fuel and air, as supplied to a combustion apparatus, such as may be associated in a steam generator, wherein separate fuel and air control signals of definite magnitude and ratio to each other for each load condition placed on the apparatus are employed to prescribe the relative rates of fuel and air to be supplied under each load condition and the rate of supply of one of the combustion components is changed in response to detection at each load condition of a differential between the heat actually released or made available from the combustion apparatus and the heat theoretically producible by the rates of fuel and air being supplied such that any variations in the heating value of the fuel or in the efficiency of the apparatus will be taken into consideration in the control action.

As a specific aspect of the above object, the fuel combustion component is preferably changed from the rate of supply dictated by its separate control signal, such change being made in response to any detected difference at each load condition between the heat actually made available and the theoretically producible heat.

Another important object of this invention is in the provision of a control method and apparatus for the combustion components, fuel and air, as they are supplied to a combustion apparatus wherein separate fuel and air control signals of definite magnitude and ratio for each load condition regulate the normal relative rates of supplying fuel and air with the supply rate of one component being changed upon detection of a differential between the actual heat made available and the heat theoretically producible at the rates of supplying fuel and air and regulation of an optimum amount of excess air for each load condition is obtained by supplementally controlling the air supply by a signal reflecting the actual rate of air flow to the combustion apparatus.

The novel features which are considered characteristic of the invention are set forth with particularity in the appended claims. The invention itself, however, and additional objects and advantages thereof will best be understood from the following description of embodiments thereof when read in connection with the accompanying drawings, in which:

FIGURE 2a is a diagrammatic part sectional illustration of an apparatus corresponding to FIGURE 2.

Figure 1:
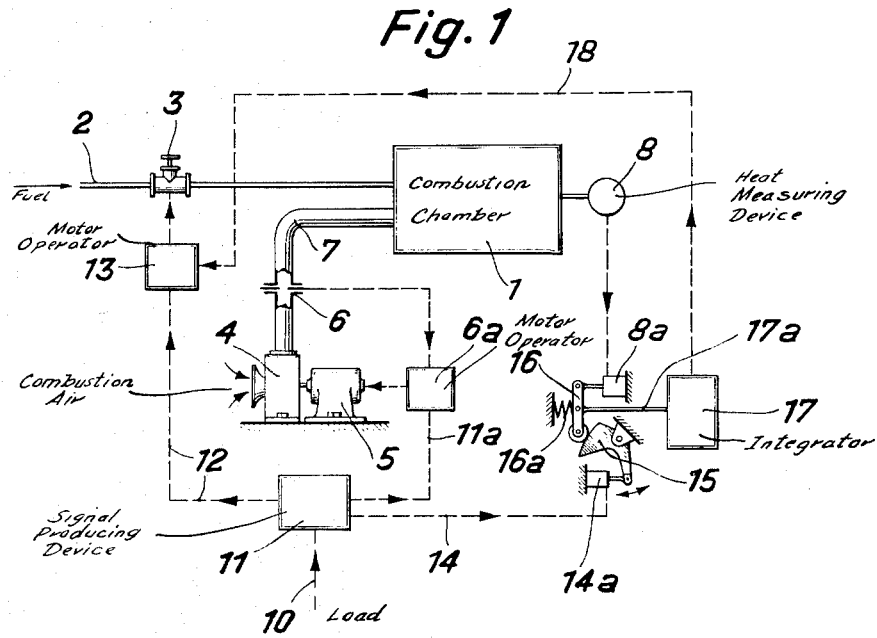
FIGURE 1 is a block diagram illustrating an embodiment of the invention.

Referring more particularly to FIGURE 1 of the drawing, numeral 1 designates a combustion chamber, for example, of a steam generator, a gas turbine, a heating system, a diesel engine. Fuel is introduced into the combustion chamber through a pipe 2 in which a fuel control valve 3 is interposed. Combustion air is supplied by a blower 4 driven by a motor 5 through a duct 7 containing a flow measuring device 6. The heat liberated by the combustion or a representative portion thereof is measured by a device 8.

A control signal corresponding to the desired heat or load is transmitted through a conductor 10 to an apparatus 11 in which signals are produced for coordinating the fuel supply and the combustion air supply to the desired load. The control signal for the fuel supply acts through a conductor 12 on a motor operator 13 for the fuel valve 3 and through a conductor 14 on an actuator 14a for swinging a cam 15 on a stationary fulcrum. It will be appreciated that, considering that this control signal for the fuel supply is selected to provide the optimum amount of fuel for each particular load condition by taking into consideration the contemplated heating value of the fuel and inherent efficiency of the combustion apparatus, this signal is also representative or indicative of the theoretically producible heat that may be obtained by combusting this fuel.

The air control signals are conducted from the apparatus 11 through a conductor 11a to a motor operator 6a for controlling the motor 5. The motor operator 6a is also responsive to signals produced by the device 6 measuring the rate of flow of combustion air to the combustion chamber to adjust the air supply and retain it in definite relationship to the actual rate of air supplied through duct 7 to the combustion apparatus. By providing the device 6 which produces signals representative of the actual air supply rate and combining these signals with the air control signals from apparatus 11 to control motor operator 6a, a precisely controlled predetermined optimum amount of excess air at each load condition can be provided with the percentage of excess air differing for different load conditions as desired.

The cam 15 is engaged by a cam follower roller at one end of a lever 16 whose second end is pivoted to an actuator 8a which is responsive to signals produced in the device 8 which signals correspond to the heat produced in the combustion chamber 1. An integrating device 17 is actuated by a rod 17a pivoted to the center of the lever 16 and accumulates minor differences between the fuel supply corresponding to the load and the fuel supply corresponding to the produced heat for producing a signal corresponding to the average discrepancy of these values. A spring 16a counteracts the forces produced by the actuators 14a and 8a. A conductor 18 transmits signals from the device 17 to the motor operator 13.

The actuator 8a and the cam 15 act in opposite directions on the lever 16 so that the pivot connection of the rod 17a is not removed if the forces produced by the actuator 8a and the cam 15 are alike. If the forces are different the rod 17a is moved. The signals in the conductors 12 and 18 are either added or multiplied in the device 13 and the resultant signal applied to operate fuel control valve 3. Multiplication is preferred for quick changes of the load because overregulations are thereby avoided.

Figure 2:
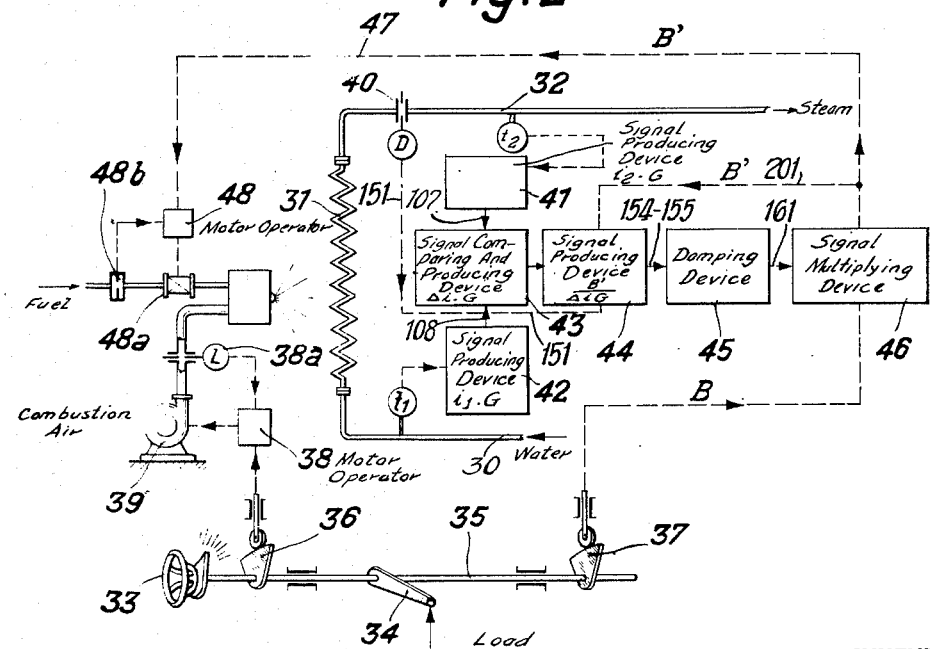
FIGURE 2 is a block diagram illustrating the application of the invention to a steam generator.

FIGURE 2 diagrammatically illustrates the application of the invention to a steam generator 31 which is supplied through a feed pipe 30 by a liquid operating medium having the temperature $t_1$ and the pressure $p_1$.

The live steam leaving the steam generator through a pipe 32 has the temperature $t_2$ and the pressure $p_2$.

The output or load of the steam generator is adjusted by means of a hand wheel 33 at the end of a shaft 35. Alternatively, a governor of a steam engine, not shown, may actuate an arm 34 for oscillating the shaft 35 which carries two cams 36 and 37 which produce control signals for the combustion air supply and the fuel supply, respectively, to a combustion apparatus of the steam generator. The signal for controlling the air supply acts on a motor operator 38 for a blower 39 which motor operator is also responsive to the amount or weight of air supplied per time unit and measured by a device 38a. The signals from device 38a representing the actual air supply rate flowing from blower 39 adjust the air supply and retain it in a definite relationship to assure a predetermined optimum amount of excess air at each load condition as dictated by the signal from cam 36.

The difference between the heat contents of the operating medium in the feed pipe 30 and in the live steam pipe 32 substantially corresponds to the amount of heat produced by the combustion apparatus of the steam generator. If considerable amounts of operating medium are removed, for example, by blowdown operations, or are added, for example, by water injection into the superheater, or if reheaters are heated by the combustion gases in addition to the steam generator, this must be considered when measuring a value corresponding to the produced heat.

Let us assume that the steam temperature $t_2$ and the pressure $p_2$ in the pipe 32 are maintained by a conventional control apparatus, not shown. The amount G of the steam produced per time unit is measured by a flowmeter 40 which produces a signal G conducted into a device 44. This signal is multiplied by a factor or signal $i_2$ corresponding to the condition $t_2$, $p_2$ which is produced by hand or automatically. The product $i_2 \cdot G$ represents the amount of heat contained in the produced steam G, $i_2$ representing the heat content per weight unit of the steam.

The device 42 produces signals corresponding to the temperature $t_1$ of the liquid operating medium entering the system. The device 41 produces signals corresponding to the temperature $t_2$ of the live steam produced by the system. The device 43 compares the signals produced in the devices 41 and 42 and produces a signal $\Delta i$ which corresponds to the difference between $t_1$ and $t_2$ and is conducted into a device 44.

In the device 44 a signal is produced corresponding to the value $$\frac{B'}{\Delta i \cdot G}$$

i.e., to the relation between a corrected value of the supplied heat B' and the heat absorbed by the operating medium, $\Delta i$ being the increase of the heat content of the medium generally represented by the difference between $t_1$ and $t_2$ and G being the amount of the medium. A signal corresponding to the latter is produced by a steam flowmeter 40 and conducted to the device 44 through a conductor 151. The value B' is represented by a signal arriving through a conductor 201. The value $$\frac{B'}{\Delta i \cdot G}$$

may vary rapidly due to unstable operating conditions and the signal produced by the device 44 is therefore integrated in a device 45 for producing a signal corresponding to $$\frac{1}{\Delta t} \cdot \int_{t-\Delta t}^{t} \frac{B'}{\Delta c \cdot G} \cdot it$$

This average value is multiplied in a device 46 by a value B representing the amount of fuel or the fuel value producing the desired load which value corresponds to the setting of the cam 37. As mentioned above, the cam 37 produces a control signal for the fuel supply selected to provide the optimum amount of fuel for each particular load condition by taking into consideration the contemplated heating value of the fuel and inherent efficiency of the combustion apparatus. By reason of these circumstances respecting the considerations involved in its selection, the signal also represents or is indicative of the heat theoretically producible by combustion of the fuel and air dictated by the signals from cams 36 and 37. The signal leaving the device 46 corresponds to $$B' = \frac{B}{\Delta t} \cdot \int_{t-\Delta t}^{t} \frac{B'}{\Delta i \cdot G} \cdot dt$$

The value B' is thereby corrected with respect to the effective fuel value and can be directly transmitted through a conduit 47 to a control means 48 for the fuel valve 48a. The amount of fuel admitted through the valve 48a is measured by a flowmeter 48b and compared in the device 48 with the value B'.

FIGURE 2a is a more elaborate illustration of the system shown in FIGURE 2. The temperature $t_2$ of the steam leaving the system through the pipe 32 is measured by the relative expansion of the pipe 32 and a rod 101. One end of the latter is connected to the pipe 32. The second end is connected to a piston in a cylinder 102 which is fast on the pipe 32. The piston connected to the rod 101 actuates through a spring a piston 103 in the cylinder 102. The piston 103 controls an outlet port for a fluid under pressure in the cylinder 102. There is an inlet port in the cylinder which is permanently open. The pressure in the cylinder 102 thus provides a signal representing the temperature $t_2$. The temperature $t_1$ of the water entering the system through pipe 30 is measured in the same way by a thermostat 104 actuating a piston 105 producing a pressure in a cylinder 106 which provides a signal representing the temperature $t_1$. The pistons 103 and 105 correspond to the elements 41 and 42 in FIGURE 2.

The cylinders 102 and 106 communicate through conductors 107 and 108, respectively, with chambers at the left side and at the right side of a piston 110 in a cylinder 109, the piston 110 being urged to the left by a spring 111. The stroke of the piston 110 is proportional to the difference between the pressures in the cylinders 102 and 106, i.e., is proportional to $t_2-t_1$ and to $\Delta i$. A piston rod 112 connected to the piston 110 is provided with a rack engaging a pinion on a logarithmic cam 113 which acts through a roller 115 on a piston which actuates through a spring a piston 114 in a cylinder 116. The path of the roller 115 effected by the cam 113 corresponds to the logarithm of stroke of the piston 110. The piston 114 controls the pressure of a pressure fluid in the cylinder 116 which pressure is proportional to the logarithm of $\Delta i$. The cylinder 116 communicates through a conduit 117 with a chamber 118 below a piston 119 in a cylinder corresponding to the device 44 in FIGURE 2. The device 109 to 116 corresponds to the device 43 in FIGURE 2.

The signal transmitted through the conduit 47 in FIGURE 2, which corresponds to conduit 172 in FIGURE 2a is proportional to the corrected fuel value B' and acts on the device 44 through a conductor 201 as well as on the motor operator 48. The signal in the conduit 172 (FIGURE 2a) acts on a piston 121 against a spring in a cylinder 120 so that the piston stroke is in linear relation to the value B'. The piston 121 acts through a rack rod on the pinion of a logarithmic cam 121a which actuates a follower roller 122 whose path is in linear proportion to log B' and which moves a piston 123 through a spring in a cylinder 124. The piston 123 controls a pressure fluid outlet in the cylinder 124 and thereby the pressure in the cylinder which is also proportional to log B'. The cylinder 124 communicates through a conduit 125 with a chamber 126 above a piston 119.

A constant k is set by means of a hand wheel 130 turning a worm revolving a worm gear on a logarithmic cam 132. The latter acts on and displaces a roller 133 and a piston 134 operatively connected thereto through a spring to an extent corresponding to log k. The piston 134 controls a pressure fluid port in a cylinder 135 so that the pressure in the latter also corresponds to the log k. This pressure is conducted through a conductor 136 to a chamber 137 above a piston 138 in the cylinder corresponding to the device 44 in FIGURE 2.

For introducing the amount of the produced steam into the control system a diaphragm 140 is provided which responds to the difference of the pressures at a venturi tube 40 in the steam pipe 32. The movements of the diaphragm are transmitted to a cam 141 acting on a roller 142 whose displacement is in linear proportion to the aforesaid pressure difference and thereof to the amount G of the produced steam. The weak signals produced by the diaphragm 140 are hydraulically amplified. For this purpose the roller 142 is pivoted to a lever, one end of which actuates a pilot valve 143 for controlling flow of a pressure fluid to and from the sides of the piston 144 in a cylinder. A rod connected to one side of the piston 144 is pivoted for feed back purposes to the second end of the lever actuated by the roller 142. The stroke of the piston 144 and of a piston rod 145 connected thereto corresponds to the amount G of the produced live steam. The rod 145 is provided with a rack engaging a pinion on a logarithmic cam 146 which engages a roller 147 whose movements which are proportional to the log of G and which actuates through a spring a piston 148 controlling the pressure of a pressure fluid in the cylinder 149 which pressure is also proportional to log G and which is transmitted through a conduit 151 to a chamber 152 below the piston 138.

The pistons 119 and 138 are interconnected. The chambers 118 and 137 are separated by a wall. On the piston 119 acts the difference between the signals corresponding to log B' and log k and on the piston 138 acts the difference between the signals corresponding to log Δi and log G. The multiplications and divisions effected by the element 44 in FIGURE 2 are produced by the addition and subtraction of the aforesaid logarithmic values. A rack rod 153 connected to the double piston 119, 138 acts on a pinion of a cam 154 which moves a roller 155 in linear relation to the value produced by the element 44. The roller 155 acts through a spring on a piston 156 controlling the pressure of a fluid in a cylinder 157 which pressure is in linear proportion to the value produced in the device 44.

In order to integrate the signals produced in the cylinder 157 a chamber 158 is connected to the cylinder for accumulating short signals and producing a mean pressure for actuating a piston 161 in a cylinder communicating through a pipe 162 with the chamber 158. The device 154 to 158 corresponds to the element 45 in FIGURE 2 and produces a signal which is multiplied by an element 163 with the fuel value B set by the cam 37. The element 163 is a two dimensional cam which is axially moved by the piston 161 and which is oscillated by a piston 164 in a cylinder 165. The latter communicates through a conduit 166 with a cylinder containing a piston 167 which is actuated by the cam 37 oscillated upon rotation of the shaft 34 by the hand wheel 168 (33 in FIGURE 2).

A feeler 169 rests on the cam 163 and actuates through a spring a piston 171 controlling a pressure fluid in a cylinder 170. The device 161, 163 to 165, 169 to 171 corresponds to the device 46 in FIGURE 2 and adjusts the pressure in the cylinder 170 according to the adjusted fuel value B'. The cylinder 170 communicates through a conduit 172 (47 in FIGURE 2) with the cylinder 120 and with a cylinder 175. The latter contains a piston 176 connected to piston valves 177 and 178 axially movable in an axially movable sleeve valve 182. The valves 177, 178 in combination with the valve 182 control the supply of a pressure fluid to the sides of a piston 179 of a hydraulic motor operator device 180 (48 in FIGURE 2) for actuating the fuel control valve 48a. The sleeve 182 is actuated by a fuel flow measuring device 48b to which the sleeve 182 is operatively connected via a cam 183 in the same manner as the steam flow measuring device 40 is connected to the piston valve 143.

The cam 36 for controlling the combustion air supply is oscillated simultaneously with the cam 37 for the fuel supply. The cam 36 actuates a piston 185 which controls the pressure of a pressure fluid in a cylinder which communicates with a cylinder 187 containing a piston 186. The latter is connected to a slide valve sleeve 188 containing piston valves 189 and 190 which are actuated in response to the air flow in the combustion air supply duct. The air flow is measured by a venturi flowmeter 191 (38a in FIGURE 2) and actuates the piston valves 189, 190 via a cam 192 in the same manner as the piston valve 143 and the sleeve valve 182 are actuated. The cams 141, 183 and 192 are for the purpose of converting the movements of the diaphragms 140, 48b and 191, which movements are in quadratic relation to the pressure differences, to linear movements. The combined movement of the valves 189, 190 and of the sleeve 188 controls the supply of a pressure fluid to the sides of a piston 193 which controls an air control damper 194 so that the latter is responsive to a value resulting from the comparison of the air flow measured by the device 191 and the value set by the cam 36.

I claim:

1. The method of controlling the supply of combustion components fuel and air to a combustion apparatus producing heat for a heat consumer operating under variable load, comprising:

controlling the rate of supply of fuel to the combustion apparatus according to the desired heat and increasing the rate of fuel supply when increased heat is desired, and conversely, controlling the rate of supply of combustion air to the combustion apparatus according to the desired heat and increasing the rate of air supply when increased heat is desired, and conversely, comparing the heat actually produced by the combustion apparatus with the desired heat, and supplementally controlling the rate of supply of fuel according to the result of comparing the actually produced heat with the desired heat for increasing the rate of fuel supply when the desired heat exceeds the actually produced heat, and conversely, while leaving the rate of combustion air supply unaffected by the result of said comparison.

2. The method of controlling the supply of combustion components fuel and air to a combustion apparatus producing heat for a heat consumer operating under variable load, comprising:

producing a provisional first set point signal for the control of fuel supply, said provisional set point signal corresponding to fuel requirements of the combustion apparatus under different load conditions and increasing at increasing load, and conversely, producing a second set point signal for the control of air supply, said second set point signal corresponding to air requirements of the combustion apparatus under different load conditions, controlling the air supply to the combustion apparatus according to said second set point signal for increasing the air supply at increasing load, and conversely, producing a third set point signal corresponding to heat requirements of the heat consumer under different load conditions and increasing at increasing load, and conversely, producing a signal corresponding to the heat actually absorbed by the heat consumer under different load conditions and increasing at increasing absorbed heat, and conversely, comparing said last mentioned signal with said third set point signal for producing a correcting signal corresponding to the deviation of the heat actually absorbed by the heat consumer from the heat requirements of the heat consumer and increasing at increased deviation, and conversely, combining said provisional first set point signal for the control of fuel supply with said correcting signal for correcting said provisional first set point signal for the control of fuel supply and increasing said provisional first set point signal when the correcting signal increases, and conversely, and controlling the fuel supply to the combustion apparatus according to the corrected provisional first set point signal for increasing fuel supply when the heat requirements of the heat consumer exceed the heat actually absorbed by the heat consumer, and conversely.

3. The method of controlling the supply of combustion components fuel and air to a combustion apparatus producing heat for a steam generator operating under variable load, comprising:

producing a first set point signal corresponding to the heat to be transferred to the steam generator under different load conditions and increasing at increasing load, and conversely, producing a first intermediate signal corresponding to the heat actually absorbed in the steam generator under different load conditions and increasing at increasing load, and conversely, producing a second set point signal for the control of
air supply, said second set point signal corresponding
to air requirements of the combustion apparatus under different load conditions, controlling the air supply to the combustion apparatus according to said
second set point signal for increasing the air supply
at increasing load, and conversely, combining said first intermediate signal with a signal
corresponding to a corrected fuel supply set point
for producing a second intermediate signal corresponding to the relation between the corrected fuel
supply set point signal and the signal corresponding
to the heat actually absorbed in the steam generator, combining said second intermediate signal with said
first set point signal for producing said corrected set
point signal for the control of fuel supply, and controlling the fuel supply to the combustion apparatus in response to said corrected set point signal for
increasing fuel supply when the heat to be transferred to the steam generator exceeds the heat actually absorbed in the steam generator, and conversely.

4. The method of controlling the supply of combustion components fuel and air to a combustion apparatus producing heat for a steam generator operating under variable load, comprising:

producing a first set point signal B corresponding to the
heat to be transferred to the steam generator under
different load conditions and increasing at increasing
load, and conversely, producing a first intermediate signal corresponding to
the heat actually absorbed by the steam generator
under different load conditions, said heat being expressed by the formula $i_2-i_1$, wherein $i_1$ is the heat
entering the steam generator with the feedwater and
$i_2$ is the heat leaving the steam generator with the
steam, producing a second set point signal for the control of
air supply, said second set point signal corresponding to air requirements of the combustion apparatus
under different load conditions, and controlling the
air supply to the combustion apparatus according to
said second set point signal, combining said first intermediate signal $i_2-i_1$ with a
signal B' corresponding to a corrected fuel supply
set point, according to the formula $$\frac{B'}{i_2-i_1}$$

for producing a second intermediate signal corresponding to the relation between the corrected fuel
supply set point signal B' and the signal corresponding to the heat $i_2-i_1$ actually absorbed in the steam
generator, multiplying said second intermediate signal with said
first set point signal B for producing said corrected
fuel supply set point signal B', and controlling the fuel supply to the combustion apparatus
according to said corrected fuel supply set point
signal.

5. An arrangement for controlling the supply of the
combustion components, fuel and air, to a combustion
apparatus producing heat for a heat consumer operating
under variable load, comprising:

means controlling the rate of fuel supply to the combustion apparatus according to the desired heat and
increasing the rate of fuel supply when increased heat
is desired, and conversely, means controlling the rate of supply of combustion air
to the combustion apparatus according to the desired
heat and increasing the rate of air supply when increased heat is desired, and conversely, means measuring the difference between the heat actually produced by the combustion apparatus and the
desired heat, and means operatively connected to said rate of fuel supply
control means and to said difference measuring means
for supplementally controlling the rate of fuel supply
to the combustion apparatus according to the difference between the actually produced heat and the desired heat for increasing the rate of fuel supply when
the desired heat exceeds the actually produced heat,
and conversely, while leaving the rate of air supply
control means unaffected by said difference.

6. An arrangement for controlling the supply of the
combustion components, fuel and air, to a combustion apparatus producing heat for a heat consumer operating
under variable load, comprising:

fuel supply control means for controlling the rate of
fuel supply to the combustion apparatus, means for producing a provisional, first set point signal
corresponding to fuel requirements of the combustion
apparatus under different load conditions, a first regulator operatively connected to said means for
producing said first set point signal, said first regulator being operatively connected to said
fuel supply control means for controlling the latter
in response to said provisional, first set point signal
for increasing the rate of fuel supply when said first
set point signal increases, and conversely, combustion air supply control means for controlling the
rate of combustion air supplied to the combustion
apparatus, means sensing the rate of supply of combustion air to
the combustion apparatus and producing a first control signal corresponding to the rate of supply of
combustion air, means for producing a second set point signal corresponding to air requirements of the combustion apparatus under different load conditions, a second regulator operatively connected to said second
set point signal producing means and to said sensing
means for comparing said second set point signal with
said first control signal, said second regulator being operatively connected to
said combustion air supply control means for controlling the latter in response to the result of comparing said second set point signal with said first
control signal for increasing the rate of air supply
when said second set point signal is greater than said
first control signal, and conversely, means producing a third set point signal corresponding
to the desired heat output of the combustion apparatus under different load conditions, means producing a second control signal corresponding to the heat absorbed by the consumer, and a comparing device operatively connected to said means
producing a third set point signal and to said means
producing said second control signal for comparing
said third set point signal with said second control
signal and producing a correcting signal corresponding to the result of said comparison, said comparing device being operatively connected to
said first regulator for combining said correcting signal wtih said provisional, first set point signal for
correcting the latter and controlling said fuel supply
control means in response to the corrected first set
point signal.

7. An arrangement for controlling the supply of the
combustion components, fuel and air, to a combustion
apparatus producing heat for a steam generator operating
under variable load, comprising:

fuel supply control means for controlling the rate of
fuel supply to the combustion apparatus, air supply control means for controlling the rate of air
supply to the combustion apparatus, means producing a first set point signal corresponding
to the rate of air supply required to produce the desired heat under different load conditions, said first set point signal producing means being operatively connected to said air supply control means for controlling the rate of air supply to the combustion apparatus according to said first set point signal, means producing a second set point signal corresponding to the heat desired to be transferred to the steam generator under different load conditions, means for producing a first intermediate signal corresponding to the heat actually transferred to the steam generator, means for combining said first intermediate signal with a signal corresponding to a corrected rate of fuel supply set point for producing a second intermediate signal corresponding to the relation between the corrected rate of fuel supply set point signal and said first intermediate signal, means for combining said second intermediate signal with said second set point signal for producing said corrected set point signal, said last mentioned means being operatively connected to said fuel supply control means for controlling the rate of fuel supply to said combustion apparatus in response to said corrected set point signal for increasing the rate of fuel supply when the heat desired to be transferred to the steam generator exceeds the heat actually transferred to the steam generator, and vice versa.

References Cited by the Examiner

UNITED STATES PATENTS

| | | | |
|---|---|---|---|
| 2,166,077 | 7/1939 | Sptizglass | 236—14 |
| 2,197,171 | 4/1940 | Annin | 236—14 |
| 2,252,368 | 8/1941 | Germer | 236—14 |
| 2,252,369 | 8/1941 | Germer. | |
| 2,264,511 | 12/1941 | Dickey | 236—14 |
| 2,433,725 | 12/1947 | Ziebolz | 236—14 X |
| 2,593,659 | 4/1952 | Dickey | 73—112 |

WILLIAM F. O'DEA, *Acting Primary Examiner.*

ALDEN D. STEWART, *Examiner.*

UNITED STATES PATENT OFFICE
CERTIFICATE OF CORRECTION

Patent No. 3,236,449                      February 22, 1966

Alfred Brunner

It is hereby certified that error appears in the above numbered patent requiring correction and that the said Letters Patent should read as corrected below.

Column 2, line 45, for "of" read -- or --; column 4, line 27, for "removed" read -- moved --; column 5, lines 34 to 36, the formula should appear as shown below instead of as in the patent:

$$\frac{1}{\Delta t} \cdot \int_{t-\Delta t}^{t} \frac{B'}{\Delta i \cdot G} \cdot dt$$

Signed and sealed this 24th day of January 1967.

(SEAL)
Attest:

ERNEST W. SWIDER                      EDWARD J. BRENNER
Attesting Officer                        Commissioner of Patents